United States Patent Office 2,765,873
Patented Oct. 9, 1956

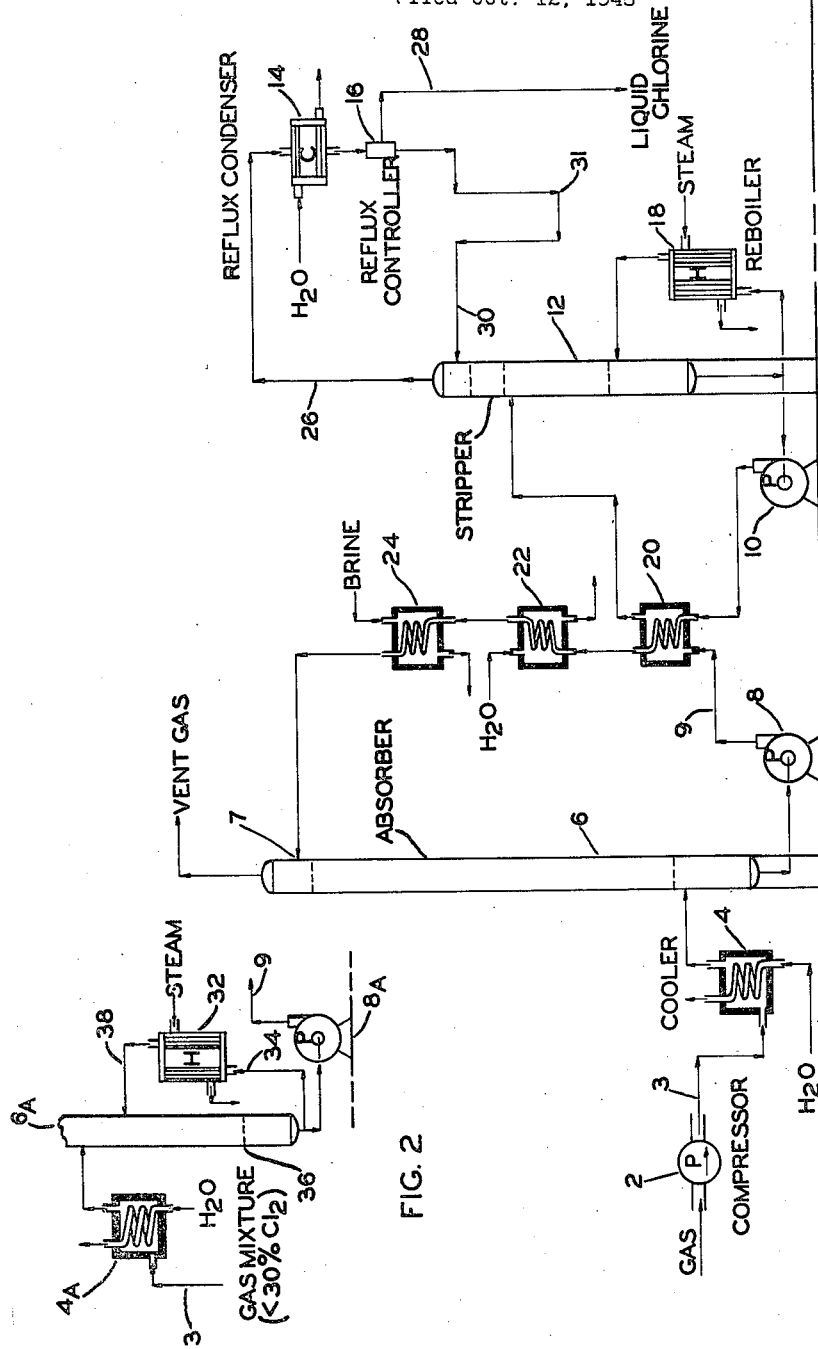

2,765,873
METHOD OF PURIFYING CHLORINE

Richard E. Hulme, Painesville, Ohio, assignor to Diamond Alkali Company, Cleveland, Ohio, a corporation of Delaware Application October 12, 1948, Serial No. 54,097

2 Claims. (Cl. 183—115)

This invention relates to a method of purifying chlorine and more particularly relates to the recovery of chlorine from mixtures with non-halogen gases. It has particular applicability to the recovery of chlorine from relatively dilute mixtures with atmospheric gases.

It has heretofore been proposed to recover chlorine from gaseous mixtures containing the same in relatively high dilution by adiabatic absorption in a suitable solvent, such as carbon tetrachloride, titanium tetrachloride, stannic chloride, pentachloropropane, sulfur monochloride, and the like. More particularly, it has heretofore been proposed to recover chlorine freed from air or other non-halogen gases by bringing the gaseous mixtures containing chlorine into intimate contact with a suitable solvent maintained substantially constantly at a temperature of the order of 0° F., while maintaining the absorption system at atmospheric pressure, or only slightly more than atmospheric pressure, and subsequently distilling chlorine from the solvent.

It has also been proposed heretofore to recover chlorine from dilute mixtures with air or other non-halogen gases by conducting the absorption of the chlorine adiabatically at more elevated temperatures, for example, of the order of 70° to 80° F., in order to inhibit the solubility of the non-halogen gases in the chlorine solution, and under substantially higher requisite pressures than atmospheric pressure, for example, 80 to 100 pounds per square inch above atmospheric pressure.

Certain notable disadvantages obtain from the use of these prior art methods for the absorption of chlorine from dilute admixtures with other non-halogen gases. For example, when the absorption is carried out adiabatically at very low temperatures, of the order of 0° F., appreciable amounts of atmospheric gases are dissolved in the solvent along with the chlorine and hence, the desired degree of separation of chlorine from non-halogen gases, particularly oxygen, is not obtained and the recovered chlorine is therefore limited in its subsequent use in chemical processes. Moreover, where carbon dioxide is one of the contaminants, about one-half of the original amount of this substance remains dissolved in the chlorine solution and appears in the final so-called purified product.

On the other hand, where the absorption is carried out adiabatically at higher temperatures and higher pressures, as noted hereinabove, the high pressures which must be employed in order to decrease the partial pressure of the solvent and thereby avoid solvent losses, are necessarily costly. Hence, it becomes economically more desirable merely to discard the dilute mixture of chlorine with other gases. The prior art has, in general, chosen to recover chlorine from dilute admixtures with non-halogen gases, such as atmospheric gases, by low temperature absorption adiabatically in a suitable solvent even though this method possessed substantial disadvantages.

The method of the present invention avoids the prior art difficulties arising from the conditions taught therein, while combining certain of the advantageous features thereof, and includes dissolving chlorine in a suitable solvent, utilizing the principle of employing low solvent temperatures in that portion of the absorption zone from which the non-halogen gases are vented, thereby avoiding solvent losses, and of employing substantially higher solvent temperatures in that portion of the absorption zone from which the solution of chlorine in the solvent is withdrawn, thereby substantially precluding the solution of the non-halogen gases, particularly carbon dioxide and oxygen, in the solvent. There results from the method of the present invention a product of high purity with respect to the non-halogen gases with which it may have been initially associated, as well as a product which is more widely usable in chemical processes than that obtained heretofore by prior art methods, and which is in every way a commercially acceptable material in the class of high purity chlorine. Moreover, this desirable result is accomplished with only insignificant losses of solvent employed in the recovery system.

More fully stated, the method of the present invention for the recovery of substantially pure chlorine from mixtures of chlorine with atmospheric gases, includes the steps of countercurrently contacting a stream of a mixture of said gases and a stream of liquid carbon tetrachloride as a solvent for said chlorine in an absorption zone at superatmospheric pressure, dissolving said chlorine and a portion of said atmospheric gases in said solvent at progressively decreasing temperatures in said countercurrent contact as the source of said solvent stream in said zone is approached, to form a solvent gas solution, progressively heating the said solvent gas solution to boil off or dissociate a major proportion of dissolved atmospheric gases and a minor proportion of dissolved chlorine contained in the solvent therefrom, combining the gases evolved from said solvent with some stream of said mixture of gases, withdrawing undissolved non-halogen gases from contact with said solvent stream at a point beyond said source and remote from said countercurrent contact in the direction of said gas stream, withdrawing a solution of chlorine in said solvent substantially freed from said non-halogen gases from said zone, and recovering purified chlorine from said last solution by distillation or other convenient means.

A flow-sheet descriptive of the method of the present invention is illustrated by the drawing, which forms a part hereof, in which, Fig. 1 is a diagrammatic representation of an apparatus for the recovery of chlorine from mixtures thereof with air, which mixtures contain from 30% to 50%, or more, of chlorine by weight, and, Fig. 2 is a fragmentary showing of a modification of the absorber section of Fig. 1, which modification renders the apparatus of Fig. 1 suitable for recovering chlorine from chlorine-air mixtures containing about 20% or less of chlorine by weight, or for the obtaining of chlorine of extremely high purity with respect to atmospheric gases, from mixtures richer in chlorine than 20% by weight.

Referring to Fig. 1 of the drawing, a mixture of chlorine and air may be introduced into the recovery system through a compressor 2, which increases the pressure on the mixture to a suitable operating pressure for the absorption, which pressure may be maintained within the range of 30 to 80 pounds per square inch, depending upon the degree of purity desired in the final product, and the temperature of the carbon tetrachloride introduced into the absorber 6 at the point 7, but preferably at a pressure of about 60 pounds per square inch when the temperature of the carbon tetrachloride is at the preferred minimum of 0° F. The cooler 4 is optional and may be included in the system when the temperature of the gas mixture, after compression, is excessive, i. e. when the temperature of the gas mixture after compression causes excessive evolution of dissolved chlorine from the solution leaving the absorber, resulting in an undesirable dilute solution of chlorine available for rectification in the distillation column 12. For the preferred conditions given above, a temperature of about 60° to 85° F. for the incoming gas mixture is preferable.

The gas mixture enters the absorber 6 near the bottom thereof and subsequently moves upwardly therethrough countercurrently in contact with a falling stream of carbon tetrachloride introduced into the absorber 6 at 7, preferably at a temperature well below temperatures elsewhere in the column, such as at 0° F. When the gas mixture contains large amounts of chlorine, for example, of the order of 30% to 50% by weight, the solution of gaseous chlorine in the carbon tetrachloride results in the carbon tetrachloride being heated appreciably, for example, from about 0° F. to about 50° to 85° F., due to the heat of solution of the chlorine therein, with the result that the solution of undesirable amounts of the atmospheric gases, particularly carbon dioxide and oxygen, in the solvent at this point is substantially precluded.

Accordingly, as the chlorine impoverished gas mixture proceeds upwardly through the absorber 6, the temperature of the solvent carbon tetrachloride stream encountered by it is progressively lower. It will be noted by reference to Fig. 1 of the drawing that the upper region of the absorber is also the region from which atmospheric gases are vented; it is desirable therefore, in the practice of the present invention, that pressure be maintained upon the absorber in order that the carbon tetrachloride will have its lowest partial pressure in this region, in consequence of which solvent losses are held to a practical minimum. By properly coordinating the temperature of the incoming refrigerated carbon tetrachloride with the pressure upon the absorber, the partial pressure of carbon tetrachloride in the gases vented from the absorber may be readily reduced to the desired low value.

From the base of absorber 6, a solution of chlorine and carbon tetrachloride may be pumped through heat exchanger 20 by means of pump 8, wherein it may be warmed to facilitate the subsequent distillation in column 12. Thereafter, the solution is conducted to column 12, in the lower section of which the carbon tetrachloride is stripped of the last traces of dissolved chlorine by sufficiently increasing the temperature thereof by means of reboiler 18, and at the top of which the chlorine is freed from the solvent carbon tetrachloride by fractionation. Chlorine gas leaves the top of column 12 through line 26 and passes to condenser 14, wherein it is liquefied; liquid chlorine then passes to reflux controller 16, which divides the liquid chlorine stream into two portions, one of which passes through line 30, which may suitably be trapped as at 31, to column 12, and the other of which passes through line 28 to product storage. Chlorine-free carbon tetrachloride may be pumped from the base of the stripping section of the column by means of pump 10 through heat exchanger 20, wherein it is cooled in heat exchange relation with the effluent chlorine solution from absorber 6, and thereafter conducted through water-cooled cooler 22, wherein the temperature thereof is further reduced. From cooler 22, the solvent carbon tetrachloride may be conducted to refrigerated cooler 24, wherein its temperature is reduced to that dictated by operating conditions prevailing in the absorber and introduced thereinto at 7. Cooling the solvent carbon tetrachloride may be carried out in a single step, if desired, or it may be carried out as a two-stage operation but for reasons of economy, it is preferable to resort to stepwise cooling of the solvent substantially as set forth above.

Referring to Fig. 2 of the drawing, 4–A, 6–A, and 8–A correspond to parts 4, 6, and 8 of Fig. 1, and 32 is a reboiler through which the solution of chlorine leaving absorber 6–A may be passed in the event that the gas mixture, from which chlorine is to be absorbed, contains of the order of 20% or less of chlorine, the mixture being led from the bottom of absorber 6–A through line 34, to reboiler 32, and thence back to absorber 6–A, at a point above the bottom section thereof through line 38. Heat is supplied in the reboiler sufficient to remove final traces of dissolved atmospheric gases from the solution of chlorine in the lower section of the absorber. When employing the reboiler of Fig. 2, a liquid level, such as is indicated at 36, is maintained in column 6–A in order that circulation may occur in the reboiler. At equilibrium conditions, the last traces of dissolved atmospheric gases are continuously expelled from the solution in the region between the reboiler 32 and the point of entry into the absorber from cooler 4–A of the gas mixture to be treated. The purified solution is withdrawn by means of pump 8–A. This procedure may also be used where chlorine of extremely high purity relative to atmospheric gases, particularly oxygen, is desired for certain organic chemical reactions which are sensitive even to minute amounts of such gases. The requisite temperatures in such instances may suitably fall within the range of 75° to 95° F., depending upon the pressure at which the absorber operates.

From the above description of the method of the present invention, it is seen that the temperature of the solvent carbon tetrachloride at the point of initial contact thereof, by the mixture of chlorine and air, is dependent upon several factors simultaneously. Thus, the rate at which the chlorine-air mixture is fed to the absorber, the concentration of chlorine in the mixture, the temperature of the mixture as it enters the absorber, the rate of flow of carbon tetrachloride through the system, and the temperature at which carbon tetrachloride enters the absorber, are all factors directly affecting this temperature at a given working pressure. Moreover, in regard to the last mentioned factor above, since carbon tetrachloride freezes at about —9° F., temperatures substantially below 0° F. for the carbon tetrachloride entering the absorber are not preferred because of the possibility of freeze-ups in the system and consequent danger of damage to the apparatus. Therefore, a suitable temperature of the order of 0° F. or somewhat higher, if desired, may be chosen for the solvent carbon tetrachloride entering the absorber and the pressure upon the system adjusted to give a partial pressure for carbon tetrachloride (at the chosen temperature), which is reduced substantially to zero at the top of the column, as unwanted expense is involved in running the system at a higher overall temperature while still maintaining the temperature differential between the top and the bottom of the column, due to necessary heat input and moreover since higher pressures to insure substantially negligible partial pressure of solvent at the top of the column will be necessary where the solvent is introduced at a higher temperature, it is apparent that operation of the system under conditions including the introduction of the solvent, such as carbon tetrachloride, at the minimum practicable temperature as noted above, is preferred. It is, of course, possible if desired to operate at any combination of temperature of entering solvent and pressure on the system which will insure substantially negligible partial pressure of the solvent at the top of the column, though materials of construction dictate an upper limit of pressure. Hence, operation much in excess of 210 pounds per square inch, with the entering solvent being at a temperature of about 90° F. and other conditions being accordingly modified, will in general not be practicable.

Conditions prevailing in the region of the absorber where the chlorine-air mixture enters the absorber may suitably be controlled by regulation of the rate at which the solvent carbon tetrachloride circulates in the entire recovery system, according to the equation $$\frac{S(u) \times L}{100 \times c} = t$$

wherein "S(u)" is the percent of solute by weight in the solution leaving the absorber; "L" is the latent heat of the solute; "c" is the specific heat of the solution leaving the absorber; and "t" is the temperature differential over the entire absorber (assuming, of course, that there are only inappreciable heat losses by radiation from the absorber system).

In order that those skilled in the art may familiarize themselves with certain details of procedure for carrying the method of the present invention into effect, the following specific example is offered:

*Example*

A mixture of chlorine and air containing 50% chlorine by weight is conducted to the compressor 2, compressed, passed through cooler 4, and thence to absorber 6, entering the absorber at approximately 60 pounds per square inch pressure above atmospheric pressure and at a temperature of about 80° F. A stream of refrigerated carbon tetrachloride cooled to approximately 0° F. is introduced at the top of the absorber and falls therethrough, countercurrently contacting the gas mixture rising therein. When the absorber column has reached equilibrium conditions with a chlorine delivery of about 139 pounds per minute, the temperature at the point of introduction of the chlorine-air mixture is at approximately 80° F. A 15% solution of chlorine in carbon tetrachloride is pumped from the bottom of the absorber by means of pump 8 and passes through heat exchanger 20, wherein the temperature of the solution is increased, and is thereafter conducted to the distillation column 12. The solution of chlorine and carbon tetrachloride enters the column 12 somewhat above the mid-section thereof at a pressure of approximately 58 pounds per square inch above atmospheric pressure. Most of the chlorine and some carbon tetrachloride immediately vaporize and pass upwardly to the rectification section of the column 12, the mixture becoming progressively richer in chlorine. Gaseous chlorine passes from the top of the rectifying section to reflux condenser 14, wherein it is liquefied and passes to reflux controller 16, a portion of the purified liquid chlorine being conducted therefrom to a storage, the remainder passing back to the rectification section. Carbon tetrachloride containing some dissolved chlorine passes downwardly through the stripper section of the column at progressively increasing temperatures. Substantially chlorine-free carbon tetrachloride is drawn off from the bottom of the stripper section, a portion thereof being conducted to reboiler 18, wherein it is heated to approximately 260° F. and conducted back to the stripper section to supply the necessary amount of heat for rectification. The remaining chlorine-free carbon tetrachloride is pumped from the base of the stripper section by means of pump 10, to heat exchanger 20, wherein it passes in heat exchange relation with the effluent from the absorber 6. The chlorine-free carbon tetrachloride is subsequently cooled to the temperature prevailing at the top of the absorber by means of heat exchangers 22 (water-cooled) and 24 (refrigerated by means of circulating brine), and is then conducted back to the top of the absorber 6 and again flows therethrough as hereinbefore described.

The data given above are applicable to an absorber, one foot in diameter by thirty feet in length, packed with ceramic Berl saddles and a carbon tetrachloride flow through the system of about 10 gallons per minute.

While the method of the present invention has been described in terms of a mixture of chlorine and air as obtained from the customary methods of purification of large volumes of chlorine in the commercial production thereof, it may also be applied with equal success to mixtures wherein other impurities of non-halogen character are present. A ready example is had in the commercial electrolysis of molten magnesium chloride to produce metallic magnesium, wherein the gaseous effluent from the electrolytic cell is a mixture of chlorine, hydrogen chloride, and air. Another example is to be found in the instance of commercial scale chlorination of organic compounds with gaseous chlorine, wherein the effluent gases from the reactor generally contain elemental chlorine and hydrogen chloride. A further example is to be found in the recovery of chlorine from the effluent gases of the Deacon process for the oxidation of hydrogen chloride to chlorine and water. By incorporating the method of the present invention for the recovery of elemental chlorine in a system employing the Deacon process for the production thereof, certain economic advantages obtain. For example, one of the chief disadvantages of the Deacon process has been the high cost of relatively pure oxygen used to effect the decomposition of hydrogen chloride. The desirability of such relatively pure oxygen lies in the fact that the effluent gases from the process contain water as substantially the only contaminant of the elemental chlorine. By incorporating the method of the present invention in the recovery system of the Deacon process, air may be used as the source of oxygen, and the effluent gases containing air as well as water, dried by condensing out most of the water resulting from the oxidation of hydrogen chloride at temperatures above the formation of chlorine hydrates (9° C.) drying the gases over sulfuric acid, or other suitable desiccant and conducting the dried gases to a system employing the method hereinabove described.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of recovering substantially pure chlorine from a gaseous mixture of chlorine with inert atmospheric gases, which includes introducing said mixture into an absorption zone maintained at a super-atmospheric pressure of between about 30 and about 210 pounds per square inch, introducing carbon tetrachloride into the zone at a temperature within the range from —9° to about 90° F. and at a point remote from the point of introduction of the gaseous mixture, countercurrently contacting the gaseous mixture and the carbon tetrachloride in the zone to form a solution of chlorine in carbon tetrachloride, maintaining a temperature gradient in the solution during passage through the zone within the range from about 50° to about 95° F. above the temperature of the entering carbon tetrachloride and withdrawing the solution from the zone in the region of the introduction of the gaseous mixture thereinto at substantially the maximum temperature achieved in the zone and recovering purified chlorine substantially free from inert atmospheric gases from the solution.

2. The method of recovering substantially pure chlorine from a gaseous mixture of chlorine with inert atmospheric gases containing from 30 to 50% of chlorine by weight, which includes introducing said mixture into an absorption zone maintained at a superatmospheric pressure of between about 30 and about 210 pounds per square inch, introducing carbon tetrachloride into the zone at a temperature of the order of 0° F. and at a point remote from the point of introduction of the gaseous mixture, countercurrently contacting the gaseous mixture and the carbon tetrachloride in the zone to form a solution of chlorine in carbon tetrachloride, maintaining a temperature gradient in the solution during passage through the zone within the range from about 50° to about 85° F. above the temperature of the entering carbon tetrachloride and withdrawing the solution from the zone in the region of the introduction of the gaseous mixture thereinto at substantially the maximum temperature achieved in the zone, and recovering purified chlorine substantially free from inert atmospheric gases from the solution.

References Cited in the file of this patent

UNITED STATES PATENTS

| | | |
|---|---|---|
| 934,400 | Goldschmidt et al. | Sept. 14, 1909 |
| 2,108,976 | Vincent | Feb. 22, 1938 |
| 2,393,229 | Bouchard | Jan. 22, 1946 |
| 2,522,059 | Ray et al. | Sept. 12, 1950 |

FOREIGN PATENTS

| | | |
|---|---|---|
| 866,780 | France | Sept. 3, 1941 |

OTHER REFERENCES

"Textbook of Physical Chemistry," Glasstone; D. Van Nostrand Co. page 683, second paragraph.